(12) United States Patent
Pildner (10) Patent No.: US 6,226,357 B1
(45) Date of Patent: May 1, 2001

(54) SECURITY SYSTEM ALARM PANEL (75) Inventor: Reinhart Karl Pildner, Brampton (CA)

(73) Assignee: Digital Security Controls Ltd., Concord (CA)

( * ) Notice: Subject to any disclaimer, the term of this patent is extended or adjusted under 35 U.S.C. 154(b) by 0 days.

(21) Appl. No.: 08/903,219

(22) Filed: Jul. 22, 1997

(51) Int. Cl.[7] .................................................. H04M 11/04
(52) U.S. Cl. ................................. 379/37; 379/26; 379/47
(58) Field of Search .................................. 379/26, 27, 37, 379/38, 39, 40, 41, 42, 43, 44, 45, 46, 47, 48, 49, 50; 340/825.06, 506, 510

(56) References Cited

U.S. PATENT DOCUMENTS

| | | |
|---|---|---|
| 3,982,242 | 9/1976 | Sheffield . |
| 4,044,351 | 8/1977 | Everson . |
| 4,097,690 | 6/1978 | Kuntz . |
| 4,262,283 | 4/1981 | Chamberlain . |
| 5,457,730 | * 10/1995 | Rounds ................................... 379/40 |
| 5,517,547 | * 5/1996 | Ladha etal. ............................. 379/39 |
| 5,799,062 | * 8/1998 | Lazzara et al. ......................... 379/40 |

FOREIGN PATENT DOCUMENTS

| | | |
|---|---|---|
| 4106023 | 8/1992 | (DE) . |
| 1232772 | 5/1971 | (GB) . |
| 2298760 | 9/1996 | (GB) . |

OTHER PUBLICATIONS

Patent Abstracts of Japan, vol. 015, No. 127 (P–1185) Mar. 27, 1991 & JP 03 012797A (Yoshinori Kojima Jan. 21, 1991.

* cited by examiner

Primary Examiner—Curtis Kuntz
Assistant Examiner—Melur Ramakrishnaiah (57) ABSTRACT

The invention provides an alarm panel connected to a telephone line. The alarm panel comprises a microprocessor connected to a circuit which operates in two states: passive and active. In the passive state, the alarm panel monitors the line for a ring signal and tests the integrity of the telephone line. In the active state, the alarm panel seizes the telephone line and provides full bi-directional communication with a receiver through the telephone line. The circuit is designed such that the individual subcircuits for each state operate independently of each other and can be modified to meet various regulatory requirements without affecting the other circuits. The circuit draws low current in the passive state. Finally, the circuit is separated from the microprocessor using only 2 or 3 optocouplers.

5 Claims, 11 Drawing Sheets

SECURITY SYSTEM ALARM PANEL

FIELD OF THE INVENTION

The present invention is directed to alarm panels for security systems and in particular, relates to alarm panels having a microprocessor and associated communication arrangement for contacting a monitoring station using the telephone system.

BACKGROUND OF THE INVENTION

An alarm panel receives signals from a host of sensors and processes these signals to determine whether an alarm condition or other reportable event has occurred. The alarm panel is typically connected to a telephone line and uses this telephone line to report the alarm condition or a reportable event to a control station. The telephone line is normally shared by the alarm panel with other downstream telephone devices but the alarm panel has priority and the ability to interrupt communications of downstream devices.

Public telephone systems vary and different regulatory bodies have developed their own specifications that alarm panels and other devices must meet to be approved.

These different specifications are not easily met with a single cost effective circuit and different circuits have been developed to meet different regulatory specifications. Separate designs for each different market increases manufacturing costs and limits manufacturing flexibility. In France, for example, regulations require that the current draw of the device is limited to between 25 and 60 mA. This is in contrast to the U.S. and Canadian requirements which do not require the circuit to be currentlimited.

As will be more fully explained, an alarm panel switches between active and a passive state. In the active state, the alarm panel is using the telephone line to communicate with a remote computer to communicate, for example, with the owner at a remote location. In the passive state, the alarm panel monitors the telephone line for a ring signal and may also conduct tests to determine line integrity.

Control panels have previously used four or five optocouplers to electrically isolate the microprocessor of the alarm panel from the telephone line. It is also known to use only two optocopulers to isolate the alarm panel microprocessor from the telephone line; however, this 2 optocoupler design has serious compromises in the operating characteristics thereof.

SUMMARY OF THE INVENTION

An alarm panel of a security system, according to the present invention, comprises a microprocessor for processing signals from security sensors and appropriately, communicating with a remote computer from time to time, using a telephone line connection. A receive optocoupler and a transmit optocoupler form part of a communication circuit connecting the microprocessor to the telephone line connection which circuit is powered by the telephone line. The receive and transmit optocouplers electrically isolate the microprocessor from the communication circuit which is directly connected to the telephone line. The communication circuit includes two subcircuits connected to the telephone line connection. These subcircuits are an AC ring signal detection subcircuit and an active communication subcircuit, each of which share the receive optocoupler.

The active communication subcircuit operates in a quiescent state or an active state. In the quiescent state the telephone line is separated from the communication subcircuit by a large resistance and there is very little current draw. In the active state the line is seized and the off-hook signals have been generated by the alarm panel. The large resistance is bypassed and full two-way communication is possible over the telephone line. There is a much higher current draw in this state.

The AC ring signal detection subcircuit monitors the telephone line connection to detect a ring signal and the signal is passed to the microprocessor. The DC communication subcircuit cooperates with the microprocessor to produce an off hook condition allowing the microprocessor to form a two-way communication through the optocouplers and the telephone line connection when the microprocessor provides an off-the-hook signal to the DC communication subcircuit through the transmit optocoupler. The AC ring detection subcircuit is designed to be DC voltage independent, have low power consumption and is designed to pass the AC component of a telephone ring signal to the receive optocoupler. The communication subcircuit is designed to determine the DC current characteristics of the communication circuit when the circuit has seized the line and the line has gone "off-hook". The ring detection characteristic can be modified by varying the AC ring detection subcircuit without any appreciable effect on the communication subcircuit. Power consumption and DC voltage characteristics of the communication circuit can be modified by changing components without any appreciable effect on the ring detection characteristics of the AC ring detection subcircuit.

The alarm panel, as defined above, is easily customized by modifying the communication subcircuit without altering the ring detection subcircuit, while still allowing the subcircuits to share the receive optocoupler. In this way, modifications can be made to either of the subcircuits to meet any particular standard and these modifications do not change the characteristics of the other subcircuit. This provides a great deal of flexibility allowing individual components of the subcircuits to be changed to meet specific requirements.

According to a preferred aspect of the invention, the communication subcircuit include a telephone line monitoring for determining if the telephone line is operable. For example, the telephone line could be cut and if this is the case, the alarm panel would like to have knowledge of this interruption of service. The telephone line monitoring arrangement includes a charge device in the communication subcircuit which is charged by a low current in the subcircuit in the quiescent state. The charge device is selectively discharged by the microprocessor producing and transmitting a signal or series of signals through the transmit optocoupler. When the microprocessor does transmit a signal, it results in a discharge of the charged device which produces a discharge signal provided to the microprocessor through the receive optocoupler. If the telephone line is not operative, the charge device is not being charged and does not produce a discharge signal. The failure to detect such a discharge signal indicates to the microprocessor that the telephone line is not available.

Accordingly to a further aspect of the invention, the subcircuits are joined at the telephone line connector and at a common section which includes the receive optocoupler.

According to yet a further aspect of the invention, the communication subcircuit includes a power dissipation arrangement which, in the event of a transient high voltage condition, dissipates the power and limits the current in the subcircuit to a design maximum, prior to reaching the maximum design transient voltage.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
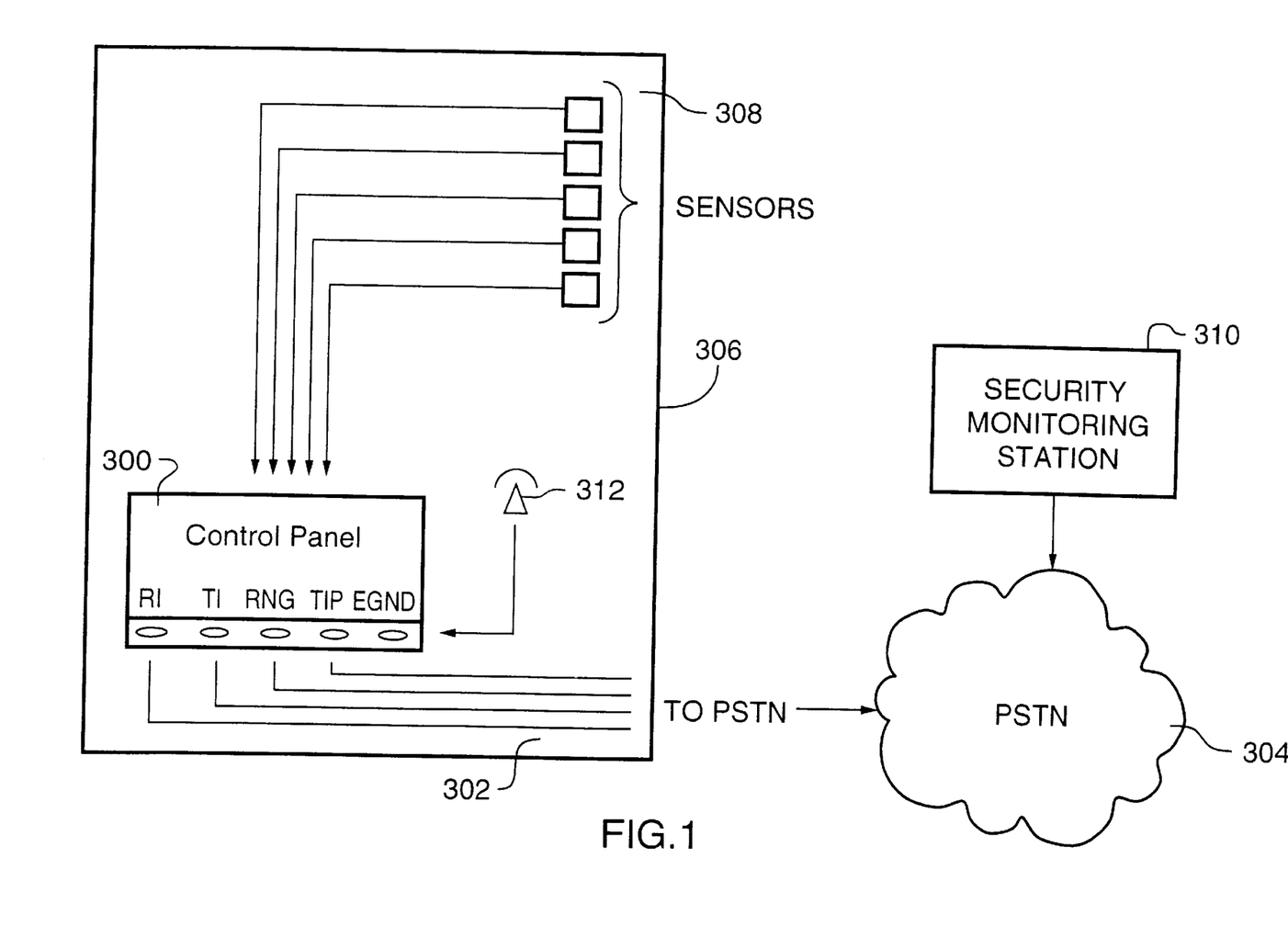
FIG. 1 is a schematic of a security system including a central panel.

FIG. 1 shows a typical control panel 300 associated with the telephone service 302 which connects the control panel to a public switched telephone network 304. The control panel 300 is typically installed in a household or other premise identified as 306 and has a series of sensors 308 appropriately distributed to provide monitoring of the premise. These sensors are in communication with the control panel 300. The control panel 300 receives the signals from the sensors and processes these signals to determine whether an alarm condition exists. Upon determination of an alarm condition, the control panel typically seizes the telephone line 302 and communicates this alarm condition to a remote security monitoring station shown as 310.

Most control panels 300 share the telephone line 302 with additional telephone devices indicated as 312 located within the premise 306. The control panel is placed between these devices 312 and the telephone line 302 such that the control panel can seize the line at any point in time and communicate with a security monitoring station or other agencies such as a police force, fire department, ambulance, as but a few examples.

It is also desirable for an alarm panel to answer certain incoming calls. For example, some alarm panels can be remotely accessed by the owner over the telephone system. Some control panels are designed to answer after a predetermined number of rings or after a second communication immediately following a first communication. With arrangements of this type, the control panel must recognize and monitor incoming telephone signals.

It is also desirable to monitor the telephone lines 302 to determine whether it is operative as it as it is known to cut the telephone line in an effort to defeat the security system. The alarm panel preferably monitors the telephone line to determine when it has been cut or is not available.

The above functions of a control panel are known, however, the present invention provides a simple way for effectively isolating the microprocessor of the control panel from the telephone service in a cost effective manner and additionally provides a circuit design which can be modified to meet the different requirements of different regulatory bodies. As discussed earlier, different telephone regulatory bodies impose different electrical response characteristics for devices, including alarm panels, connected to the respective telephone system. In particular, certain response characteristics must be met when the alarm panel is merely connected to the line and when it has seized the telephone line. The present design allows convenient modification of the control panel to meet different requirements of different regulatory bodies. In addition, the circuit allows sharing of the receive optocoupler functions to reduce the overall costs of the circuit.

To achieve these results, control panel 300 is designed to operate in two distinct states: a passive standby state and an active state.

In the passive standby state the control panel is not using the phone service 302 and the downstream telephone devices indicated as 312 can use the service in the normal manner. The control panel has the ability at any point in time to disconnect the devices 312 from the telephone service and to seize the line for the control panel to report an alarm or other security condition over the telephone line. When the control panel is in the passive state, the phone line is either in use by one of the devices 312 or the phone line remains available for use by any of the devices. When the phone line is available and even when the phone line is in use by one of the devices, there is a voltage on the telephone line and this voltage can be used to indicate that the telephone service is available for use. It is desirable for the control panel to monitor the telephone line while maintaining the line available for normal use.

The control panel enters the active state upon recognition of an alarm condition or a reportable event. In the active state, the control panel either (1) seizes the line if the line is in use and disconnects that communication and then initiates an outgoing communication over the telephone line or (2) seizes the telephone line isolating the telephone devices 308 from the service and causes the telephone line to go off-hook, and initiates an outgoing telephone communication.

The present circuit has a low current draw of less than 20 uA and maintains excellent ring sensitivity. This is accomplished by splitting the incoming telephone signal to produce a signal for ring detection and a rectified signal for communication.

Figure 2A:
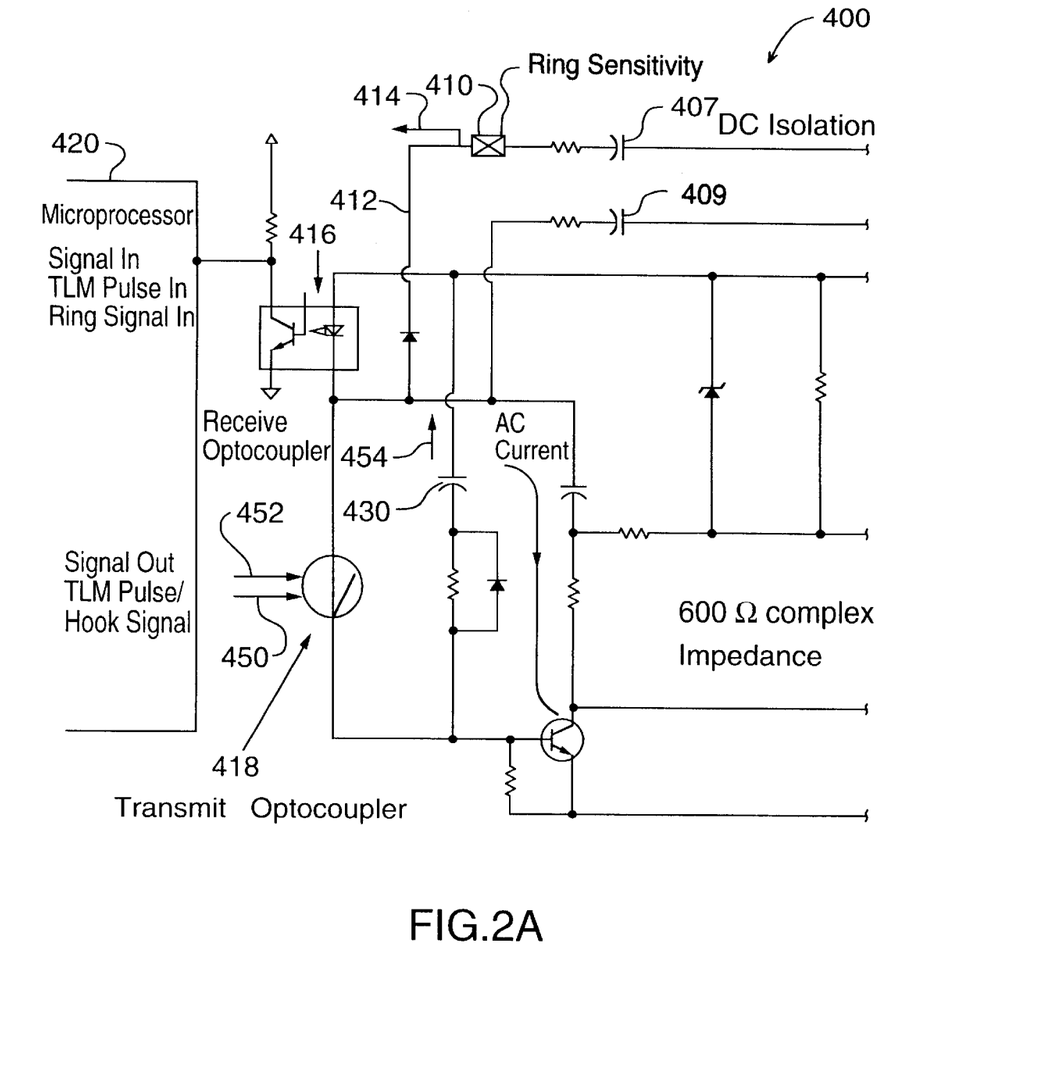
FIG. 2A and 2B illustrate a simplified circuit diagram of the communication arrangement of a control panel.

Referring to FIGS. 2A and B, FIGS. 3A, 3B, 3C and 3D, more details of the operation of the circuit in its two states may be seen. The operation of the alarm panel circuit in each state will be described in turn.

Figure 2B:
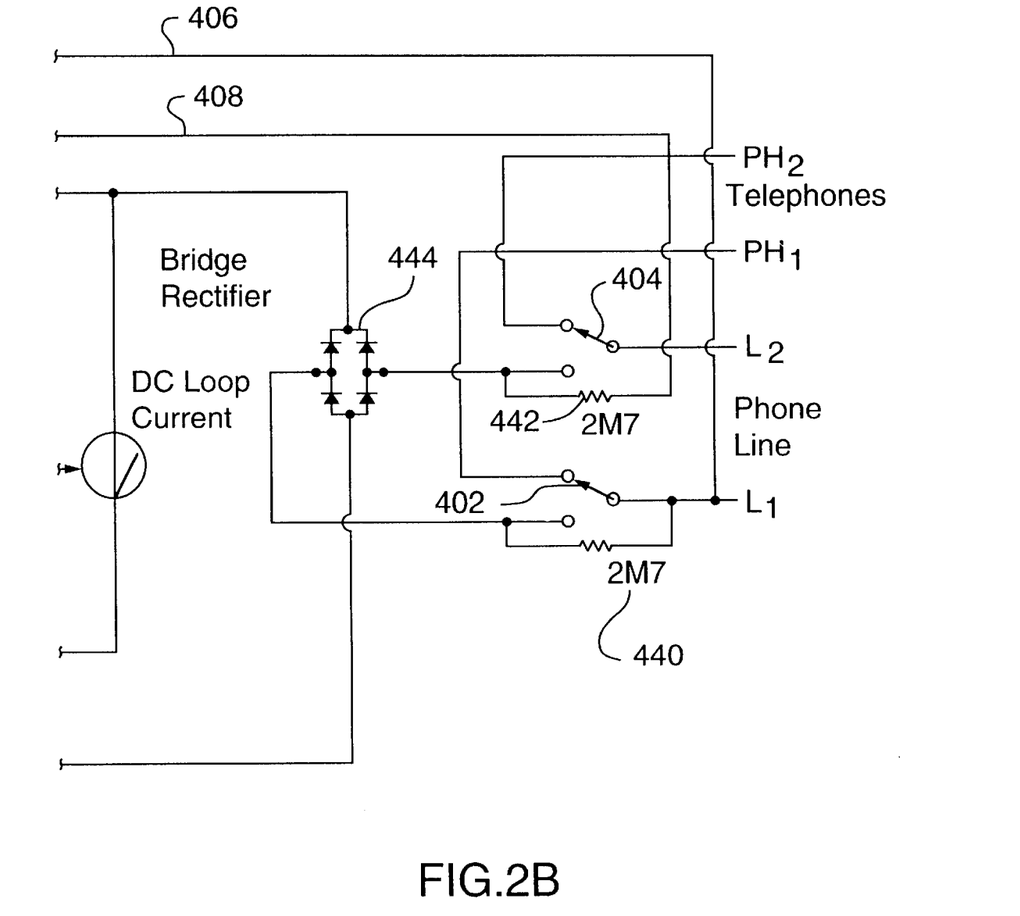
Figure 3A:
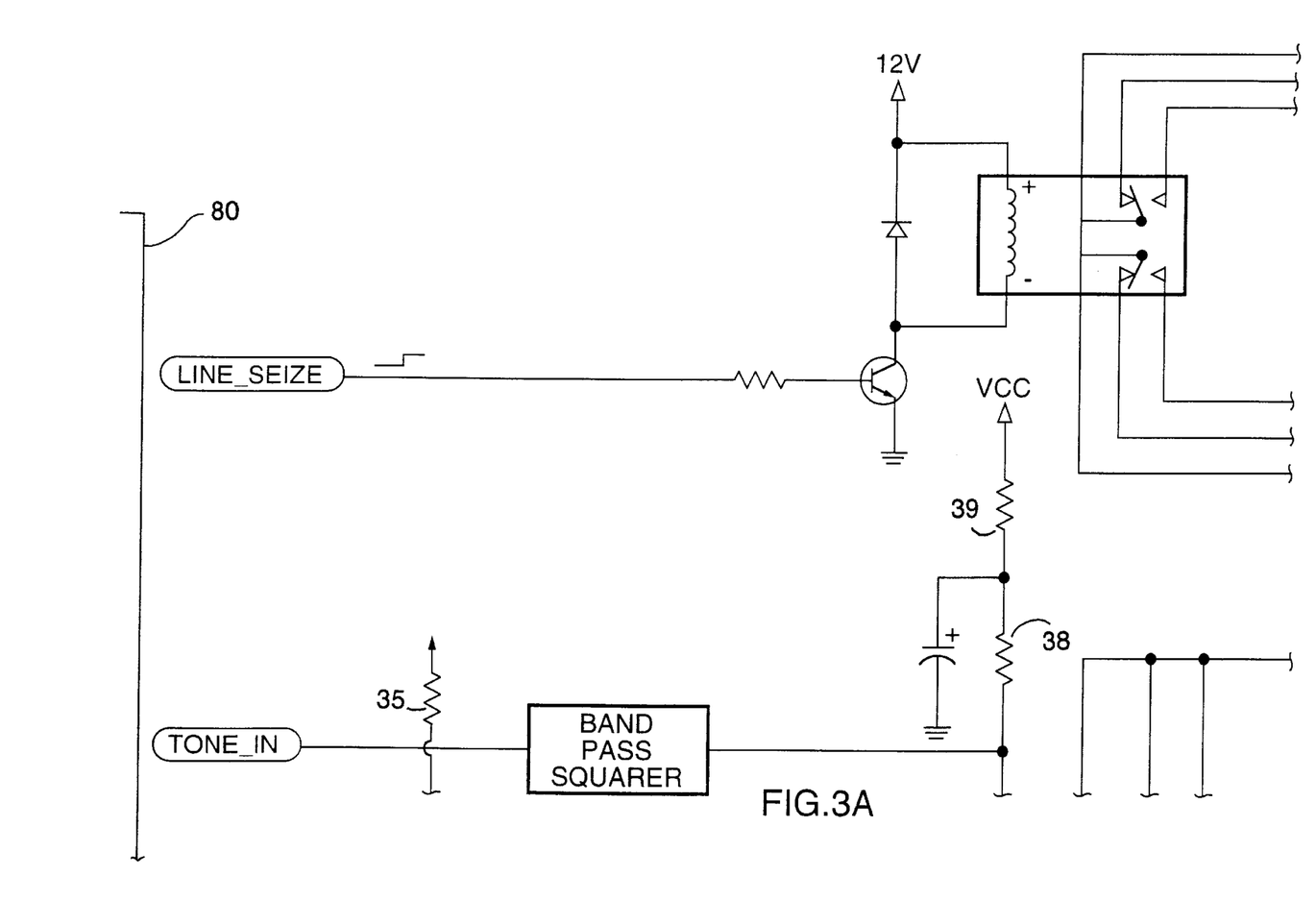
FIGS. 3A, 3B, 3C and 3D illustrate a circuit diagram of the communication arrangement of an alarm panel.
Figure 3B:
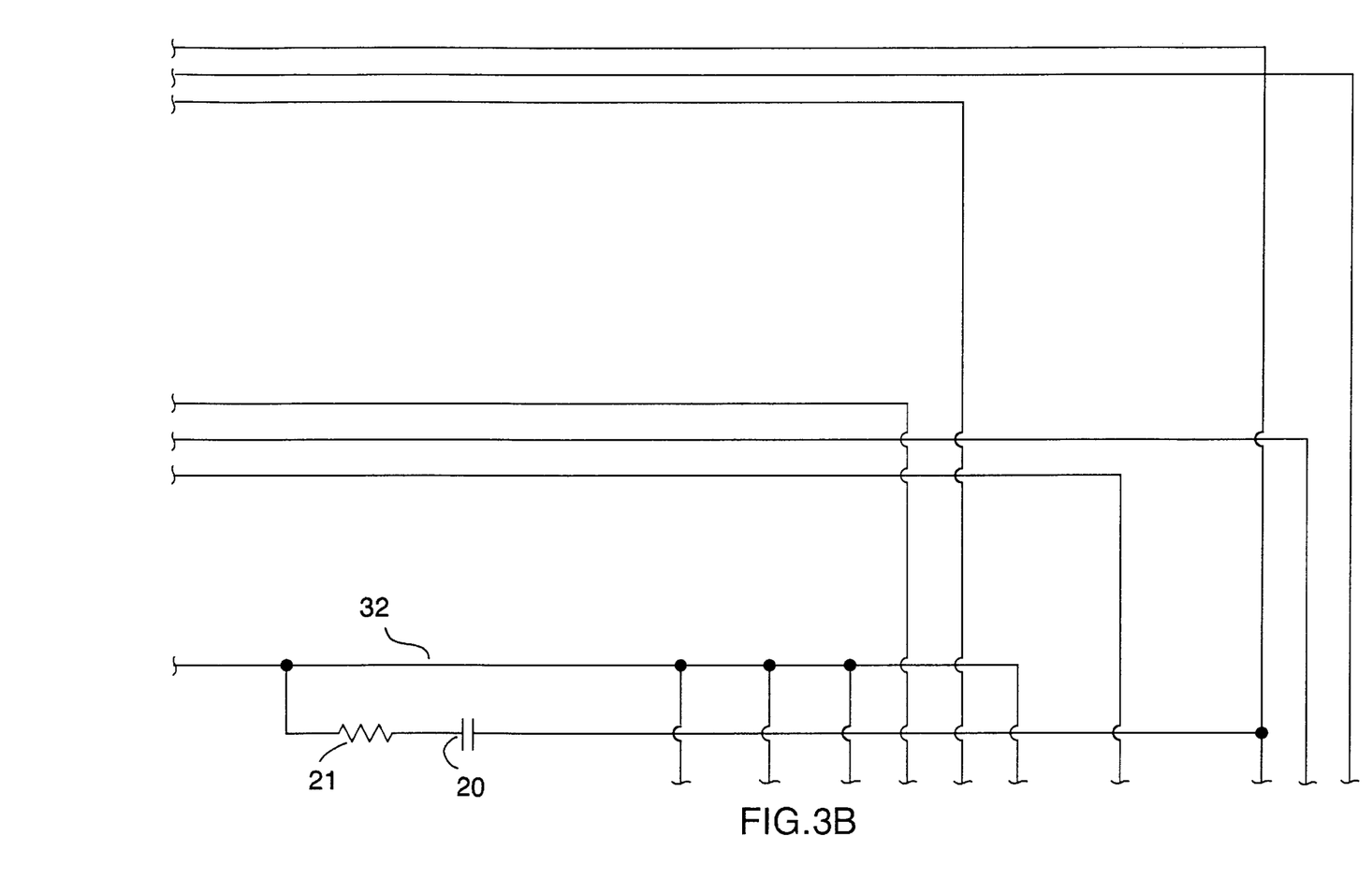
Figure 3C:
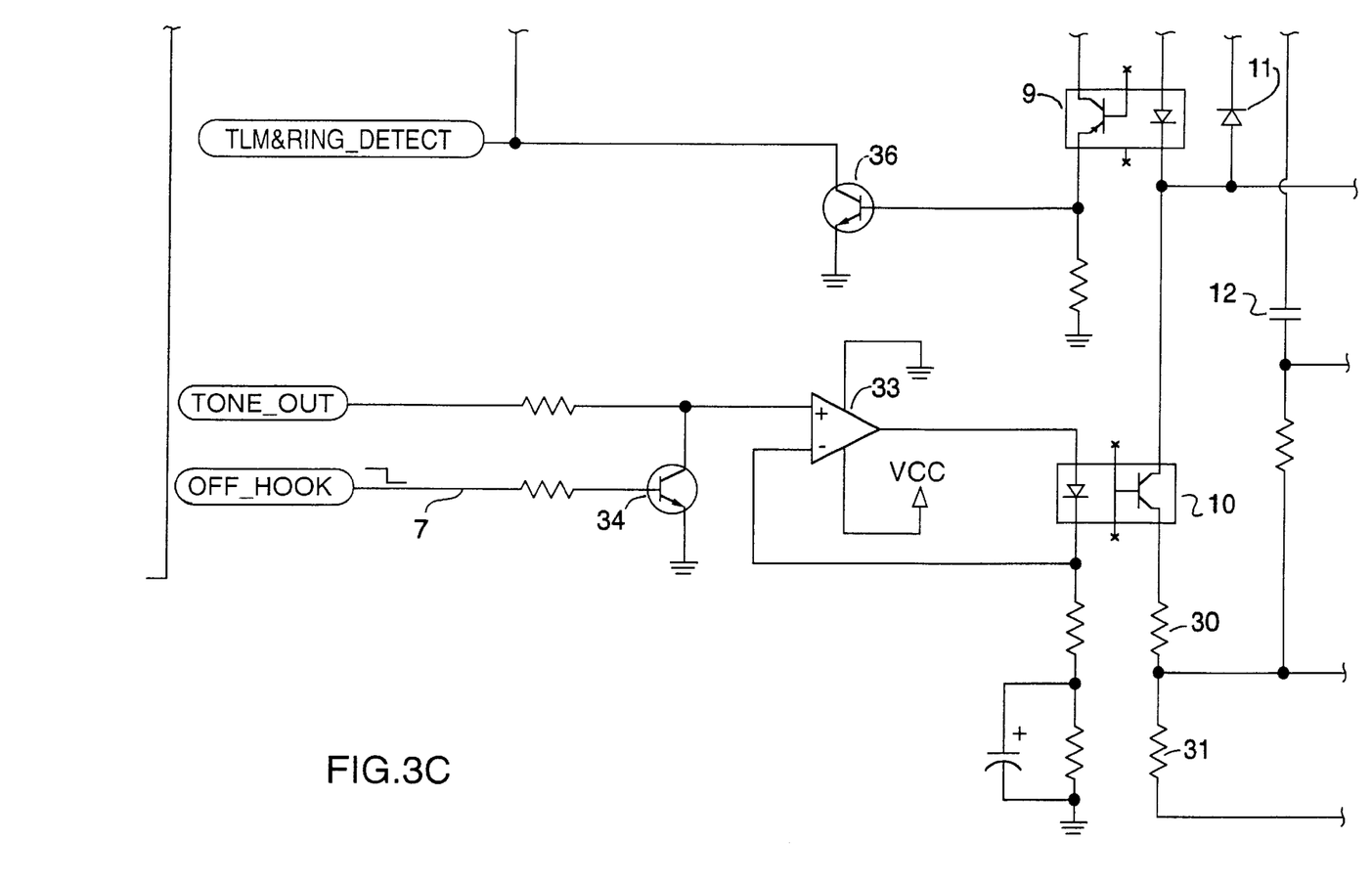
Figure 3D:
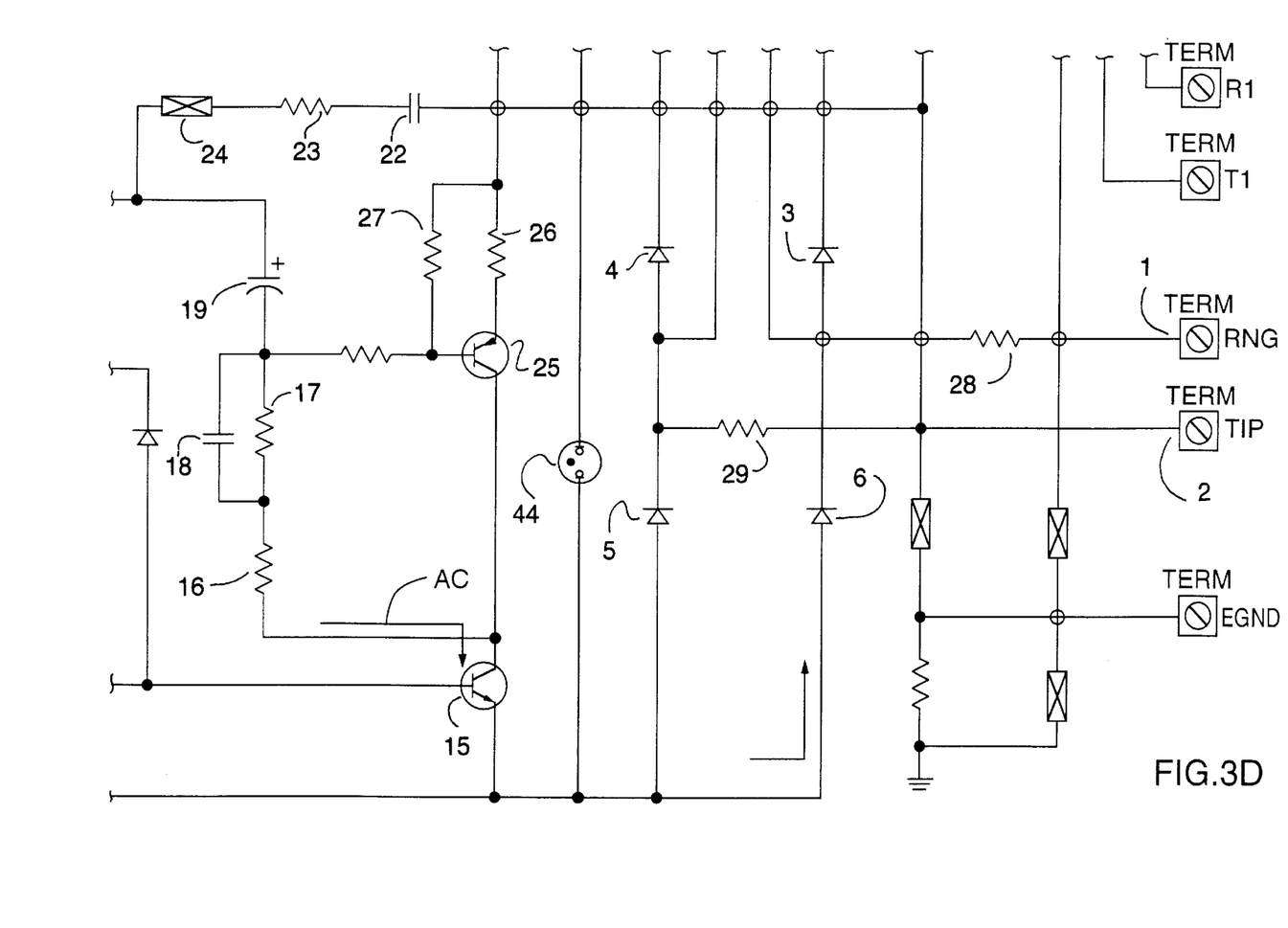
Figure 4A:
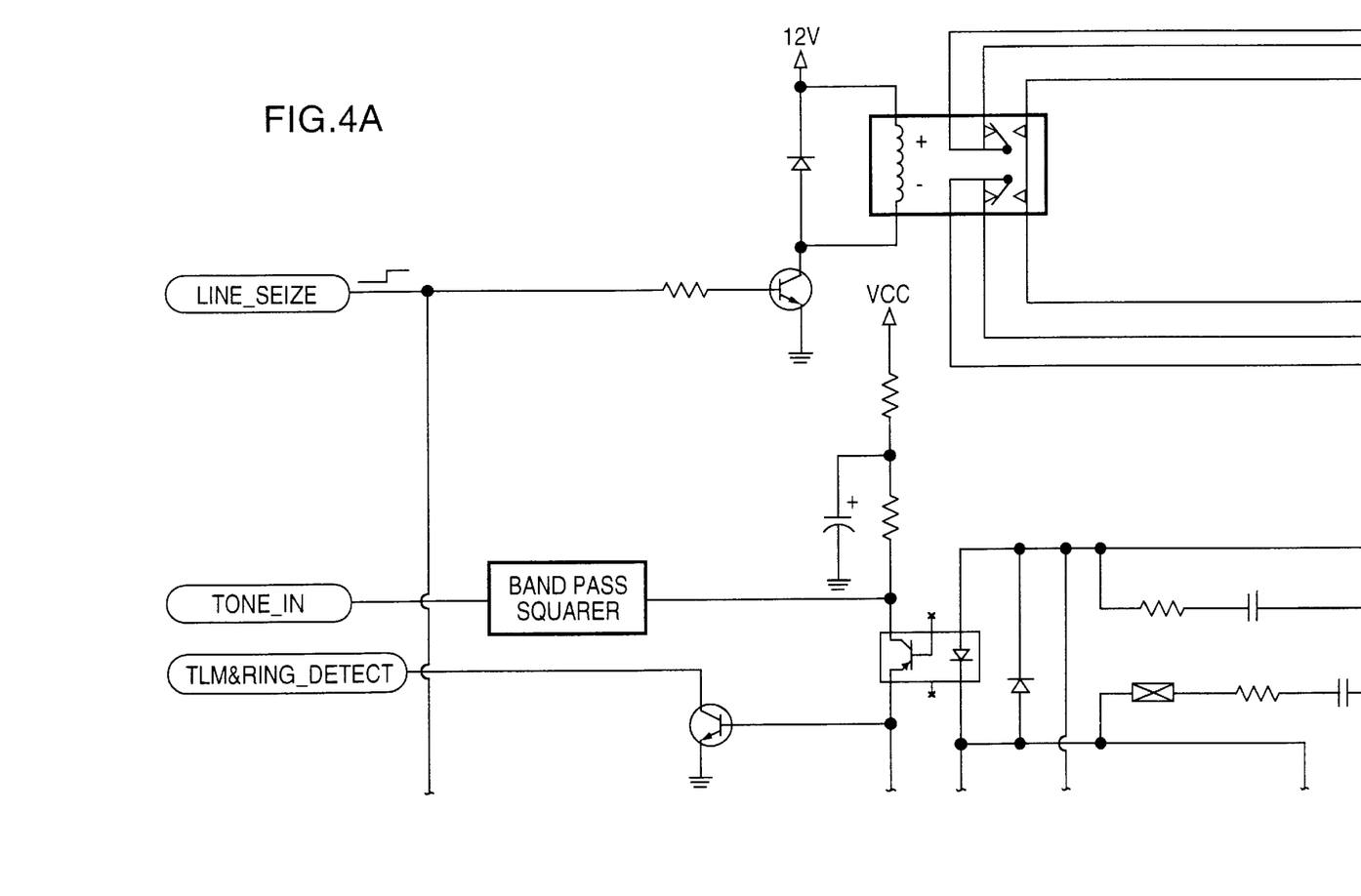
FIGS. 4A, 4B, 4C and 4D illustrate a circuit diagram of a preferred embodiment of the communication arrangement of an alarm panel.
Figure 4B:
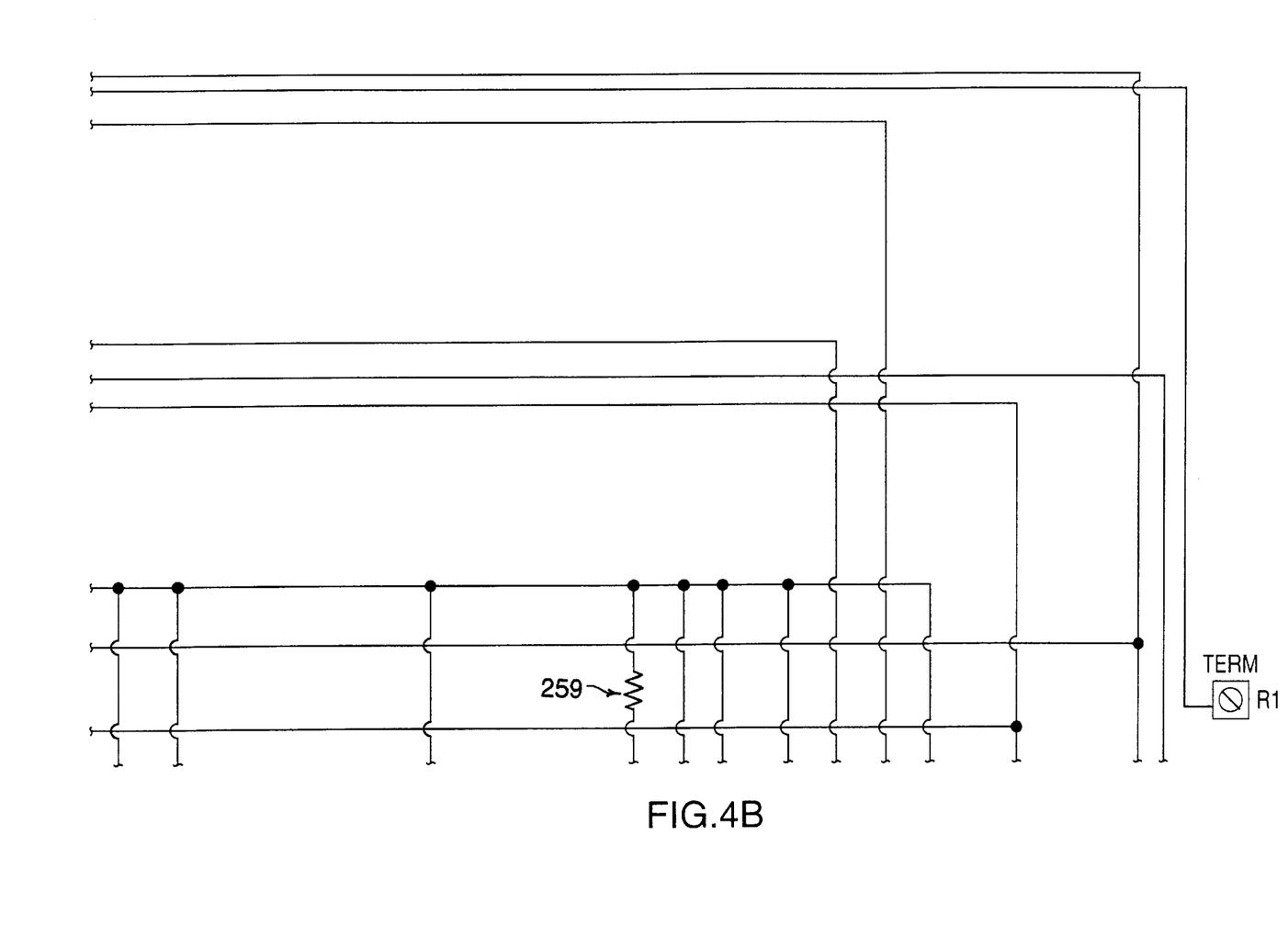
Figure 4C:
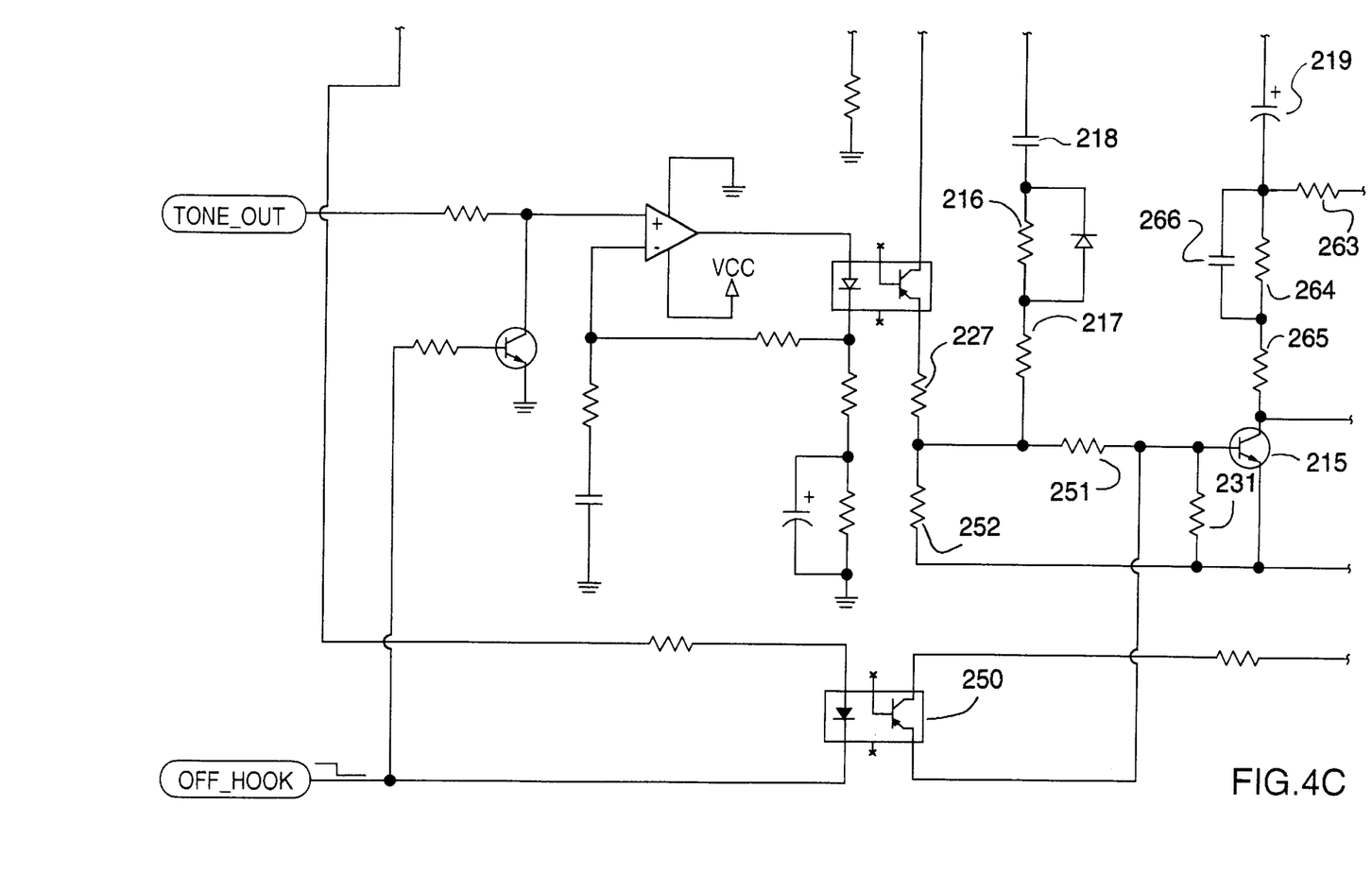
Figure 4D:
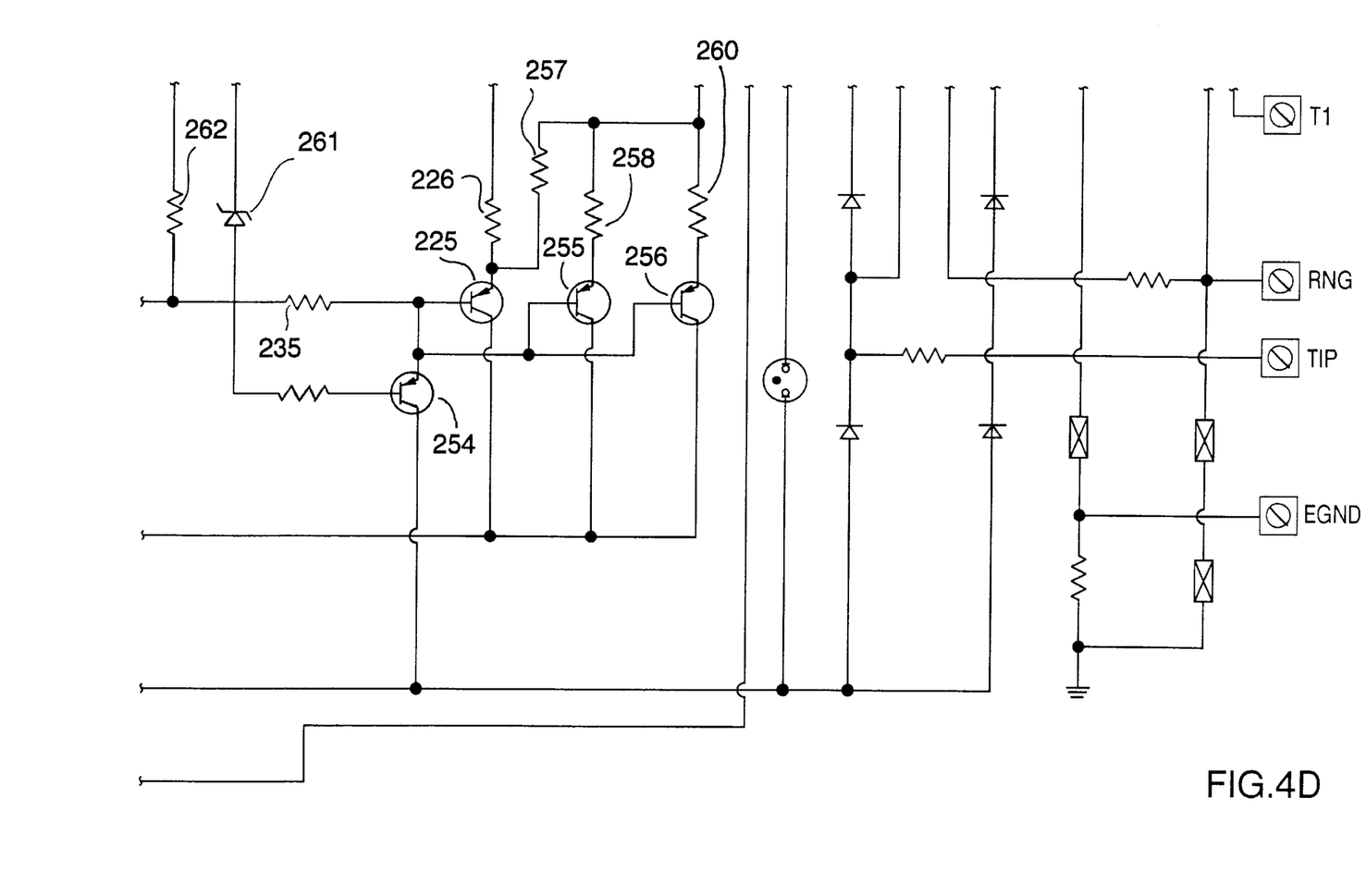

FIGS. 2A and 2B show control panel 400 operating in the passive state. Control panel 400 is shown with lines L1 and L2 connected to the telephone system and the house telephones are generally shown as connected to PH1 and PH2. Line seizure switches 402 and 404 are shown in their normal position and connect lines L1, L2 to PH1, PH2. In this state, the phone devices of the household can function in the normal manner.

In the passive state, two separate circuits can be seen. The first circuit provides telephone line integrity monitoring and the second provides ring signal detection.

In the line integrity monitoring circuit, lines L1 and L2 are divided immediately before large resistors 440 and 442. Bridge rectifier 444 is separated from lines L1, L2 by resistors 440 and 442. These resistors limit the signal that is passed to the bridge rectifier 444 and provide a very low current draw by that part of the circuit. Many telephone companies have imposed a maximum current draw by telephone devices of 10 uA, when the line has not been seized.

In the line integrity monitoring circuit, a communications subcircuit is provided to monitor the integrity of the telephone line. This is achieved by charging a capacitor in the subcircuit using the voltage in the subcircuit from the telephone line and periodicially sampling the stored voltage therein. The capacitor is charged through large resistors, which restricts the current drawn from the phone line to under 10 uA when in the passive state. The capacitor voltage is sampled periodically when the microprocessor issues a telephone line monitoring (TLM) pulse. This pulse activates the transmit optocoupler, which thereby completes a return loop circuit for the capacitor. Any voltage stored in the capacitor produces a discharge current, flowing through the receive optocoupler. Any current flowing through the receive optocoupler is sensed by the microprocessor. If the telephone line is cut, the charge on the capacitor is dissipated. As a result, the microprocessor would not receive pulses through the receive optocoupler, thereby indicating a cut or faulty phone line.

Microprocessor 420 controls the transmit optocoupler 418. The microprocessor can send a telephone line monitoring pulse to the transmit optocoupler 418 as shown as signal 450. When this signal is provided to the transmit optocoupler, it conducts, thereby completing the subcircuit with capacitor 430. As such, capacitor 430 discharges, producing the signal indicated as 454. The resulting current triggers the receive optocoupler 416. This causes a pulse to be generated by level controlling circuitry which is received by the microprocessor. As such, if the telephone line is functioning properly, when the microprocessor generates a telephone line monitoring pulse 452, the microprocessor should receive a response pulse due to the signal 454 being produced by the discharge of the storage capacitor 430. If no response pulse is detected, i.e., there is no current flow through the receive optocoupler, then the microprocessor assumes the telephone line is has a problem or has been disconnected. The microprocessor issues these telephone line monitoring pulses on a predetermined regular frequency and thus, the microprocessor continuously monitors the integrity of telephone line.

FIGS. 3A, 3B, 3C and 3D show aspects of the TLM circuit in more detail.

The TLM circuit is charged by a low current DC signal passed through resistors 28 and 29. In the passive standby state trickle current flows from the telephone line to capacitor 12, and charges it. Eventually, capacitor 12 becomes fully charged, presenting a high DC resistance to signals at 32.

When the microprocessor tests the integrity of the telephone line, it forces TLM signal line 7 low. In turn, transistor 34 and op amp 33 bias the signal and cause optocoupler 10 to conduct. Thereafter, any voltage stored in capacitor 12 discharges in series through optocouplers 9, 10 and resistor 30. When current flows through optocoupler 9 it conducts and generates a signal. The signal is biased by transistor 36 and resistor 35 and is sent to the TLM monitoring input of the microprocessor. As the voltage stored in capacitor 12 is drained, the current from capacitor 12 through optocoupler 9 decreases. At some point, the diode of optocoupler 9 stops conducting and the microprocessor does not receive any further TLM signals. When the microprocessor forces the TLM line signal 7 high, the discharge return loop for the circuit is broken and capacitor 12 can be charged again as before.

If the telephone line has been disconnected, then there is no source voltage to charge capacitor 12. As it is possible for capacitor 12 to charge and then have the line disconnected, a first TLM signal is sent through the circuit to discharges initial voltages stored in capacitor 12. A second TLM signal is then generated to determine whether capacitor 12 has been recharged. If the telephone line has been disconnected, capacitor 12 is not recharged and no second TLM detection signal can be generated. The microprocessor samples this signal on a regular basis.

In the standby passive state, the first circuit uses large resistors to reduce current draw. This low current draw inherently degrades the sensitivity of the first circuit to detect a ring signal on the telephone line.

To overcome this, a second circuit in the passive standby state provides ring signal detection on the telephone line. The ring signal detection circuit bypasses the large resistors of the first circuit and monitors only the AC component of signals on the telephone line, thereby having only a minimal effect on current draw. In this design, the circuit advantageously greatly reduces the current draw until a ring signal has been detected or microprocessor 420 seizes the line for another reason. For example, microprocessor 420 may wish to send an initiation signal to the alarm receiver.

Advantageously, the processed ring detection signal is fed to the same receive optocoupler of the first circuit, thereby reducing the total number of components in the circuit.

Referring to FIGS. 2A and 2B, the ring signal detection circuit of the passive standby state circuit has lines 406 and 408; capacitors 407 and 409 do not pass the DC portion of the telephone signal through the lines. Meanwhile, the AC portion of the signal is passed to the ring sensitivity device 410. This device looks at the AC signal being provided thereto and determines whether a ring signal is present. It can pass each of the pulses of the ring signal or can produce a separate signal indicated as 414 which is provided over line 412 to the receive optocoupler 416.

When an AC ring signal is present and forward biases the receive optocoupler 416, the receive optocoupler generates a ring detect signal, which is provided to the microprocessor. In response to a ring detect signal, the microprocessor sends a signal to activate the switches 402 and 404 causing them to reverse their position. In the reverse position, the telephone devices at home are cut off from the telephone system and in addition, a bypass has been provided past the large resistors 440 and 442. In this way the normal telephone signal is provided to the bridge rectifier 444.

FIGS. 3A through 3D provide more detail on the ring signal detection circuit. The circuit comprises ring terminal 1, capacitor 20, resistor 21, optocoupler 9, diode 11, metal-oxide varistor ("MOV") 24, resistor 23 and capacitor 22, and tip 2. MOV 24 provides the ring sensitivity for the circuit and is selected to provide specified voltage sensitivity responses.

The ring signal detection circuit operates as follows. When an AC ring signal is present on the telephone line, the AC signal flows largely unimpeded through resistor 21 and capacitor 20 to optocoupler 9. Capacitor 20 blocks the DC component of the signal from the remainder of the circuit. The AC signal causes the internal transistor of optocoupler 9 to conduct. The AC signal continues from the optocoupler through MOV 24, through resistor 23 and capacitor 22, and leaves through tip 2.

For generation of a ring detect signal, the internal transistor of optocoupler 9 is connected to two pull-up resistors 38 and 39 to the power voltage. As such, when the internal transistor conducts, the collector of the internal transistor is pulled to the power voltage. This forces transistor 36 to conduct, thereby initiating a low signal sent to the microprocessor. This low signal indicates that a ring signal pulse was detected on the line. This signal is generated for every positive portion of the AC ring signal. As such, the ring detect signal sent to microprocessor 80 is a burst of pulses.

The ring sensitivity device 410 can be designed to provide a desired ring sensitivity as it is completely separated from the bridge rectifier 444 and in particular, separated from the large resistors 440 and 442. Further, as the ring detect circuit is isolated from the rest of the circuit through the large resistors, it can be modified without affecting the operating characteristics of the other circuits.

As described earlier, when the alarm panel responds to an incoming call or needs to initiate telephone communications with the receiver, the circuit switches into to active state. The alarm panel may need to initiate telephone communications in response to signals received from its various security sensors.

FIGS. 2A and 2B are used to illustrate aspects of the alarm panel operating in the active state. In this state, the telephone line is seized from downstream telephone devices by activating the hook switch and the line seize relay.

The hook switch is activated when the microprocessor produces an off hook signal 450 and transmit optocoupler 418 conducts. The line seize relay switches 402 and 404 are activated to the active position by the microprocessor. The active position is the opposite position shown in FIG. 2. With switches 402 and 404 in the active position, the telephone signals bypass resistors 440 and 442 and as such the unattenuated telephone line signal is provided to bridge rectifier 444. As such, in the active state, the microprocessor can transmit unattenuated signals over the telephone lines and receive unattenuated signals through the receive optocoupler 416.

The telephone line must have a DC resistance and an AC impedance as within the specifications set by the telephone regulatory bodies of each country. A current source that is proportional to the incoming telephone line voltage is set to represent the DC resistance required by the specific telephone company including those that require current limiting to below 60 mA under all line conditions. The current sources AC impedance is much greater than the 600 ohm impedance so that it won't interfere with the value of $Z_L$ or complex impedance specified by the telephone companies. The AC signal from the telephone line is impressed across $Z_L$ (600 ohms or complex impedance) as it is AC coupled to the receive optocoupler. Incoming signals from the input optocoupler are passed to the microprocessor after signal conditioning and evaluation. Output signals are modulating the telephone line current via the output optocoupler. The base emitter junction of the hook switch and the diode of the input optocoupler are both low impedance for AC signals, therefore do not impede modulation of the telephone loop current.

FIGS. 3A through 3D provide more detail on the operation of the circuit in the active state.

In the active state, microprocessor 80 generates off-hook signal 7. The present embodiment the signal is active low. Transistor 34 and op-amp circuit 33 are connected to optocoupler 10. When off-hook signal 7 is forced low, optocoupler 10 conducts, thereby initiating hook switch transistor 15.

An active AC telephone signal circuit allows the panel to send and receive unattenuated AC signals over the telephone line. The active AC circuit comprises the bridge rectifier diodes 3, 4, 5 and 6, receive optocoupler 9, transmit optocoupler 10, capacitors 18 and 19, resistors 16 and 17, and off-hook transistor 15. The network of capacitors 18 and 19 and resistors 16 and 17 provide the complex impedance characteristics of the circuit when operating in the active state. Signals generated by the ASIC are injected into the telephone line signal through op-amp 33 and transmit optocoupler 10. These injected signals flow through resistors 30 and 31 to the rectifying bridge, and out of the circuit.

The DC operating characteristics of the circuit in the active state provide a defined voltage-current characteristic to meet regulatory requirements of various countries. When hook switch 15 is active, DC current flows through the rectifying bridge of diodes 3, 4, 5 and 6, then through resistors 27 and 26. As the DC active voltage increases, transistor 25 provides more DC current to the active state circuit. The DC current flows through transistor 25, through hook switch transistor 15 and out to the rectifying bridge.

Further, in the active state, the signals which would normally flow through AC ring signal detection circuit bypass the circuit through neon bulb 44. As such, in the active state, receive optocoupler 9 will react only to signals present in the active AC circuit.

It can be appreciated that various circuits may be used in place of transistor 25 to provide different voltage-current draw characteristics. For example, in FIG. 4, transistors 225, 254, 255 and 256 and resistors 226, 235, and 258 establish a staged transistor network providing an active DC current draw characteristic suitable for Scandinavian countries.

In another configuration, zener diode 261 provides a current-limited response characteristics, which conforms to the requirements French regulations. As the DC voltage increases on the telephone line, zener diode diode 261 clamps the voltage at the base of transistor 225, thereby limiting the current drawn by the active state circuit.

It is another feature of this invention to provide a single circuit board which may be used for different manufacturing builds of the alarm panel. For example, the manufacturing build for a French alarm panel would use the same circuit board for a build of a North American alarm panel. By using the same board, manufacturing costs are reduced.

FIGS. 4A, 4B, 4C, and 4D show aspects of the circuit required to provide different manufacturing builds on one circuit board. In the present embodiment, a particular board configuration is selected by simply bypassing one section of the circuit for another. To achieve this flexibility, optocoupler 250, 0 ohm resistors 251 and 252 are provided. The configuration is selected by populating on the board with either resistor 251 or resistor 252.

When resistor 251 is populated on the board the voltage-current response characteristics of the circuit are governed by the configuration circuit comprising darlington transistor 215, transistors 225, 254, 255 and 256 resistors 226, 227, 235, 216, 217, 257, 258, 259, 260, 262, 263, 264, 265, capacitors 218, 219 and 266, and zener diode 261.

When resistor 252 is populated the above-noted configuration circuit is bypassed with transistors 225 and 215, and resistors 231 and 262 forming the active mode circuit.

From the above, it can be seen that the division of the circuit into these separate subcircuits allows a low current draw in a generally passive state while allowing the full signal to be transmitted in an active state. These subcircuits advantageously share a single transmit optocoupler. The design allows standardization of a common circuit board for many countries and it also allows the circuit board to be customized by changing particular values of individual components to meet the requirements in different countries. This advantage is possible due to the separation of the signals as discussed.

From the above it can also be seen that the ring detection subcircuit and communication subcircuit work independently of one another while sharing the common receive optocoupler. The circuit, as shown, only has two optocouplers while it still provides ring detection adjustability and an effective communication subcircuit to be modified to meet specific jurisdiction requirements. This is particularly beneficial for meeting the various requirements in different countries, as the components of the subcircuits can be varied without appreciably affecting the other subcircuit. The communication arrangement provides a convenient method for monitoring the condition of the telephone line and allows the microprocessor to effectively sample the communication arrangement from time to time, and determine whether the telephone line is still present.

Although various preferred embodiments of the present invention have been described herein in detail, it will be appreciated by those skilled in the art, that variations may be made thereto without departing from the spirit of the invention or the scope of the appended claims.

What is claimed is:

1. In a control panel of a security alarm system a communication circuit which selectively operates in a low current draw passive standby state or a higher current draw active state, said communication circuit including telephone line connecting means connecting said communication circuit to a telephone line through which telephone signals are received and transmitted, a microprocessor for selecting the operating state of said communication circuit, receiving and transmitting signals over said telephone line, detecting ring signals on said telephone line, and evaluating integrity of said telephone line, signal dividing means for dividing a received telephone signal for processing in a first branch of said communication circuit for ring detection and in a second branch for telephone line monitoring in the standby state and for full communication in the active state, a switch arrangement controlled by said microprocessor for switching between a position where said communication circuit is in the passive standby state and a position where said communication circuit is in said active state, a receive optocoupler and a transmit optocoupler through which a microprocessor interacts with said telephone line, said first branch for ring detection, in the passive standby state of said switch, having circuitry for ring detection which processes the telephone signal by blocking a DC component passing with the AC component of the ring signal and producing an output signal and transmits said output signal to said receive optocoupler when a ring signal has been detected in said AC component, said switch arrangement, in the standby passive state connecting a large resistance in series with said second branch which large resistance severely restricts the signal of said second branch to a very low current draw for charging a charge device to provide an indication whether the telephone line is operative which signal is not suitable for ring detection, said charge device being operatively connected to said receive optocoupler and said transmit optocoupler and discharging when said microprocessor causes said receive optocoupler to transmit a telephone line monitoring signal and said switch arrangement is in said passive state, said charge device when discharging producing a signal received by said receive optocoupler indicating said telephone is functioning, said switch arrangement in said active state causing said large resistance to be bypassed, an offhook device connected to said transmit optocoupler and controllable by said microprocessor to cause said telephone line to go offhook when the switch arrangement is in the active state and said microprocessor transmits an offhook signal, through said transmit optocoupler, said second branch being connected to said receive optocoupler and providing AC communication signals thereto in said active state, derived from said telephone signals, said microprocessor monitoring said receive optocoupler for a signal after initiating said telephone line monitoring signal for providing an evaluation whether said telephone line is functioning, said first and second branches operating independently of the other branch such that components in one branch can be changed without any substantial change in the operating characteristics of the other branch.

2. In a control panel as claimed in claim 1 wherein said first branch of said communication circuit extracts the AC component of the telephone signal and processes the AC component for a ring signal.

3. In a control panel as claimed in claim 2 wherein said first branch is essentially passive with negligible DC current draw to detect a ring signal.

4. In a control panel as claimed in claim 1 wherein said communication circuit in said passive standby state, uses said telephone line to provide a trickle current for charging said charge device and uses said transmit optocoupler and said receive optocoupler during discharge of said charge device to form a circuit with said charge device.

5. In a control panel as claimed in claim 1 wherein said receive optocoupler acts as a normally open switch and is selectively closed, said transmit optocoupler when closed with said switch arrangement in said passive standby state completes a circuit with said receive optocoupler and said charge device allowing said charge device to discharge, said transmit optocoupler when closed with said switch arrangement in said active state causing said off hook device to go off hook with said receive optocoupler receiving signals over the telephone lines and said transmit optocoupler transmitting signals over said telephone lines.

* * * * *